(12) United States Patent
Pellingra et al.

(10) Patent No.: US 7,371,465 B2
(45) Date of Patent: May 13, 2008

(54) POLYOLEFIN FILM WITH EMBOSSED SURFACE

(75) Inventors: Salvatore J. Pellingra, Wolcott, NY (US); Robert A. Migliorini, North Haven, CT (US)

(73) Assignee: ExxonMobil Oil Corporation, Irving, TX (US)

( * ) Notice: Subject to any disclaimer, the term of this patent is extended or adjusted under 35 U.S.C. 154(b) by 73 days.

(21) Appl. No.: 10/134,903

(22) Filed: Apr. 29, 2002

(65) Prior Publication Data

US 2003/0203230 A1 Oct. 30, 2003
US 2005/0282027 A9 Dec. 22, 2005

Related U.S. Application Data

(63) Continuation-in-part of application No. 09/280,475, filed on Mar. 30, 1999, now Pat. No. 6,391,425.

(51) Int. Cl.
*B32B 15/08* (2006.01)
*B32B 27/08* (2006.01)

(52) U.S. Cl. ............ 428/461; 428/457; 428/500; 428/516

(58) Field of Classification Search ........ 428/461, 428/515, 516, 517, 172
See application file for complete search history.

(56) References Cited

U.S. PATENT DOCUMENTS

| | | | |
|---|---|---|---|
| 4,413,109 A | 11/1983 | Haas | 526/348 |
| 4,536,184 A | 8/1985 | Ryan | 8/508 |
| 4,681,803 A | 7/1987 | Liu | 428/348 |
| 4,769,418 A | 9/1988 | Mizuno et al. | 525/106 |
| 4,886,687 A | 12/1989 | Malott | 428/4 |
| 4,894,264 A | 1/1990 | Ako et al. | 428/34.2 |
| 5,055,338 A * | 10/1991 | Sheth et al. | 428/155 |
| 5,153,074 A | 10/1992 | Migliorini | 428/463 |
| 5,194,318 A | 3/1993 | Migliorini et al. | 428/215 |
| 5,254,394 A | 10/1993 | Bothe et al. | 428/212 |
| 5,328,743 A | 7/1994 | Wynne et al. | 428/105 |
| 5,498,474 A * | 3/1996 | Schuhmann et al. | 428/323 |
| 5,591,520 A | 1/1997 | Migliorini et al. | 428/347 |
| 5,683,805 A | 11/1997 | Oita et al. | 428/343 |
| 5,888,648 A | 3/1999 | Donovan et al. | 428/349 |
| 5,894,048 A | 4/1999 | Eckart et al. | 428/339 |
| 5,928,762 A * | 7/1999 | Aizawa et al. | 428/156 |
| 5,972,496 A | 10/1999 | Bader et al. | 428/331 |
| 5,981,079 A | 11/1999 | Mount, III et al. | 428/461 |
| 6,013,353 A | 1/2000 | Touhsaent | 428/203 |

(Continued)

FOREIGN PATENT DOCUMENTS

EP 0641647 A2 * 3/1995

(Continued)

*Primary Examiner*—Monique R. Jackson
(74) *Attorney, Agent, or Firm*—D. M. Tyus; R. A. Migliorini; R. F. James

(57) ABSTRACT

An embossable, multilayer, polyolefin film comprising a core layer comprising a polyolefin and an appearance enhancing agent selected from the group consisting of coloring agents, phosphorescence producing agents, reflective agents, and mixtures thereof, wherein the core layer comprises the interior of the film; and an embossable layer exterior to and on one side of the core layer, the embossable layer comprising an olefin polymer, and being particularly suitable for embossing and subsequently receiving a metal layer thereon.

63 Claims, 2 Drawing Sheets

U.S. PATENT DOCUMENTS

| | | | |
|---|---|---|---|
| 6,025,059 A | 2/2000 | McGee et al. | 428/219 |
| 6,074,762 A | 6/2000 | Cretekos et al. | 428/516 |
| 6,077,602 A | 6/2000 | Liestman et al. | 428/327 |
| 6,120,636 A | 9/2000 | Nilsen et al. | 156/230 |
| 6,181,446 B1 | 1/2001 | Cox et al. | 359/3 |
| 6,183,829 B1 | 2/2001 | Daecher et al. | 428/64.1 |
| 6,294,267 B1 * | 9/2001 | Benoit | 428/515 |
| 6,391,425 B1 * | 5/2002 | Migliorini et al. | 428/172 |
| 6,558,788 B1 * | 5/2003 | Butler et al. | 428/336 |
| 6,677,029 B2 * | 1/2004 | Wilkie | 428/172 |

FOREIGN PATENT DOCUMENTS

| | | |
|---|---|---|
| JP | 10217401 | 8/1998 |
| WO | WO 00/58090 | 10/2000 |
| WO | WO-02/060688 | 8/2002 |

\* cited by examiner

POLYOLEFIN FILM WITH EMBOSSED SURFACE

This application claims the benefit of and is a continuation-in-part of regular U.S. patent application Ser. No. 09/280,475 filed Mar. 30, 1999, now U.S. Pat. No. 6,391,425, granted May 21, 2002.

FIELD OF THE INVENTION

The present invention relates to a novel cast polyolefin film or oriented polyolefin film having an embossable surface. More particularly, the present invention relates to an embossable cast polyolefin film or an embossable biaxially oriented polyolefin film comprising a coloring, phosphorescent, or reflective agent, wherein the cast film or the oriented film optionally may be embossed and/or metallized to produce final films that are suitable for various applications including decorative, prismatic or holographic packaging materials.

BACKGROUND OF THE INVENTION

Films having a decorative, prismatic or holographic appearance are known in the art. These conventional films, however, are dominated by polyester films, which are able to handle the high temperatures needed for this application and provide a visually appealing and strong finished product. One of the advantages to using the film of the present invention (e.g., a biaxially oriented polypropylene film), is in the economics. The polyolefin films (e.g., OPP) of the present invention are less dense than those films made from polyethylene terephthalate, and thus they offer cost savings to the purchaser in an improved yield for the same amount of film by weight. They also may be more easily tailored for advantages or benefits in terms of physical properties such as sealability, oxygen and water barrier properties, coefficient of friction, or printability.

The film of the present invention has been tailored to provide a substrate that is easy to emboss, provides a brilliant embossed and metallized surface, and also contains a high energy treated surface on the unembossed side for further converting. Further, the film of the present invention provides color or optical effects that were previously only available with coating or laminating steps.

U.S. Pat. No. 5,194,318 to Migliorini, et al. discloses a metallized oriented film combination having a propylene polymer substrate with a high density polyethylene skin layer on at least one side thereof and a thin metal layer deposited on the surface of the high density polyethylene. U.S. Pat. No. 5,194,318 is incorporated herein by reference in its entirety.

U.S. Pat. No. 5,153,074 to Migliorini discloses a metallized oriented film combination having a propylene polymer substrate with an ethylene vinyl alcohol copolymer (EVOH) skin layer on at least one side thereof and a thin aluminum layer deposited on the surface of the EVOH. U.S. Pat. No. 5,153,074 is incorporated herein by reference in its entirety.

U.S. Pat. No. 5,591,520 to Migliorini, et al. discloses a metallized oriented film combination having a propylene polymer substrate with an amorphous polyamide or a blend of amorphous polyamide and a semicrystalline polyamide layer on at least one side thereof and a thin vacuum metallized layer deposited on the surface of the polyamide. U.S. Pat. No. 5,591,520 is incorporated herein by reference in its entirety.

U.S. Pat. No. 4,413,109 to Haas discloses an embossed ethylene-propylene copolymer film having a thickness of less than or equal to 24 microns. A method and apparatus for making the film by blow-extruding the ethylene-propylene copolymer into a tubular web, pinching the tubular web between pinch rolls, and embossing the pinched web by passing it between an embossing roll and a pressure roll. U.S. Pat. No. 4,413,109 is incorporated herein by reference in its entirety.

Copending allowed U.S. application Ser. No. 09/280,475 by Migliorini et at filed Mar. 30, 1999, granted as U.S. Pat. No. 6,391,425 on May 21, 2002, discloses an embossed, cast polyolefin film or an embossed, oriented polyolefin film that comprises: (a) a core layer comprising a propylene polymer; (b) an embossed outer layer on one side of the core layer, the embossed outer layer comprising an olefin polymer capable of being embossed; and (c) an additional outer layer on a side of the core layer opposite to the embossed outer layer, the additional outer layer comprising an olefin polymer. The embossed film can then be metallized to produce a shiny, metallic film having a decorative, prismatic or holographic appearance.

U.S. Pat. No. 6,183,829 to Daecher et al discloses an apparatus for formation of high quality plastic sheet in a continuous fashion. Also disclosed are a variety of optical and electronic display applications for high quality plastic sheet produced in a continuous fashion. U.S. Pat. No. 6,183,829 is incorporated herein by reference in its entirety.

U.S. Pat. No. 6,181,446 to Cox et al discloses a holographic shrink wrap element containing a shrink wrap film and a layer on the shrink wrap film, wherein the layer contains a holographic image. A process for preparing a holographic shrink wrap element includes providing, in the following order, a holographic polymer film having a holographic surface, a layer on the holographic surface and a shrink wrap film, and removing the holographic polymer film, leaving the holographic image on the layer. U.S. Pat. No. 6,181,446 is incorporated herein by reference in its entirety.

U.S. Pat. No. 4,886,687 to Malott discloses a passive, reusable visual amusement or warning device includes a handle and a number of light diffracting strips bearing an embossed holographically generated diffraction pattern. The diffraction pattern in the foil is produced in a planar format, and the strips bearing the pattern are displayed and viewed in a curved format. Ambient light striking the strips is diffracted to produce a dynamic, kaleidoscopic readily noticed display of brilliant colors. U.S. Pat. No. 4,886,687 is incorporated herein by reference in its entirety.

U.S. Pat. No. 6,120,636 to Nilsen et al discloses a continuous process for producing printed patterns on retroreflective material, wherein a partially cured pattern is printed on a roll of film and partially cured cube-corner prisms are bonded to the film over the printed matter thereby encapsulating the printed matter to protect the printed matter from the environment. U.S. Pat. No. 6,120,636 is incorporated herein by reference in its entirety.

Copending U.S. application Ser. No. 09/757,175 by Lu et al, filed Jan. 9, 2001, published as U.S. Publication Ser. No. 2003/0021981 on Jan. 30, 2003, discloses a multi-layered colored thermoplastic film comprising an opaque core layer comprising a thermoplastic material and a first skin layer comprising a thermoplastic material with a coloring agent adjacent the core layer, and a method of producing same. Copending U.S. application Ser. No. 09/757,175, published as U.S. Publication Ser. No. 2003/0021981 on Jan. 30, 2003, is incorporated herein by reference in its entirety.

SUMMARY OF THE INVENTION

Inventive aspects of this invention include polyolefin films with a colored, shiny, metallic appearance, for embossing on one or both sides of the film, such as embossed, prismatic, or holographic images. This invention can yield a differential film appearance from one side to the other side (e.g., silver metallic look on one side of the film and a gold metallic look on the other side of the film). Another advantage is tat these unique films can be produced without the need for additional converting steps of printing, coating, and/or laminating the film. Additionally, unique reflective and phosphorescent (glow-in-the-dark) metallized polyolefin films can be produced with or without a holographic image. Copending allowed U.S. application Ser. No. 09/280, 475, granted as U.S. Pat. No. 6,391,425 on May 21, 2002, by Migliorini et al, describes clear embossable and embossed films suitable for metallizing to form non-colored, non-reflective and non-phosphorescent holographic films. This invention is distinguished from copending allowed U.S. application Ser. No. 09/280,475, granted as U.S Pat. No. 6,391,425 on May 21, 2002, by yielding embossable, embossed and holographic films with metallic colored, reflective, and phosphorescent appearance attributes.

In accordance with these and other objects of the present invention, an embossable cast polyolefin film or an embossable oriented polyolefin film is provided, wherein the film comprises:

(a) a core layer comprising a polyolefin and an agent selected from the group consisting of coloring agents, phosphorescence producing agents, reflective agents, and mixtures thereof, wherein the core layer comprises the interior of the film;

(b) an embossable layer exterior to and on one side of the core layer, the embossable layer comprising an olefin polymer; and optionally, (c) a high energy skin layer may be located on the other side of the core.

In an alternate embodiment of the present invention, at least one of the outermost surfaces of the film of the present invention is metallized to provide a final film having a colored, reflective, or phosphorescent appearance.

In an alternate embodiment of the present invention, the embossable surface of the film of the present invention is embossed and then metallized to provide a final film having a shiny, metallic holographic image that is colored, reflective, or phosphorescent in appearance.

Objects and advantages of the present invention include one or more of the following:

To provide an embossed, multilayer polyolefin film that may be metallized to produce a final film having a decorative, prismatic or holographic appearance;

To provide an embossed, multilayer polyolefin film having a shiny, metallic decorative, prismatic or holographic appearance;

To provide an embossed, multilayer polyolefin film having a high energy surface on the unembossed side; wherein the high energy surface may be further converted after metallization;

To provide an embossed, multilayer polyolefin film having a heat sealable surface on the unembossed side;

To provide a process for producing an embossed, multilayer polyolefin film that has a brilliant embossed appearance without leaving any residue on the embossing machine;

To provide an embossed, multilayer polyolefin film having desired optical effects;

To provide an embossed, multilayer polyolefin film having desirable color properties;

To provide an embossed, multilayer polyolefin film having desirable phosphorescent properties;

To provide an embossed, multilayer polyolefin film having desirable reflective properties;

To provide an embossed, multilayer, metallized polyolefin film having desired optical effects;

To provide an embossed, multilayer, metallized polyolefin film having desirable color properties;

To provide an embossed, multilayer, metallized polyolefin film having desirable phosphorescent properties;

To provide an embossed, multilayer, metallized polyolefin film having desirable reflective properties;

To provide a non-coated BOPP micro-embossable film;

To provide a coated BOPP micro-embossable film;

To provide an embossable, multilayer polyolefin film having a colored, reflective or phosphorescent appearance;

To provide an embossable, multilayer polyolefin film that may be metallized to produce a final film having a shiny, metallic, colored, reflective, or phosphorescent appearance.;

To provide an embossable, multilayer polyolefin film having a high energy surface on the unembossable side; wherein the high energy surface may be further converted after metallization;

To provide an embossable, multilayer polyolefin film having a heat sealable surface on the unembossable side;

To provide an embossable, multilayer polyolefin film having desired optical effects;

To provide an embossable, multilayer polyolefin film having desirable color properties;

To provide an embossable, multilayer polyolefin film having desirable phosphorescent properties;

To provide an embossable, multilayer polyolefin film having desirable reflective properties;

To provide an embossable, multilayer, metallized polyolefin film having desired optical effects;

To provide an embossable, multilayer, metallized polyolefin film having desirable color properties;

To provide an embossable, multilayer, metallized polyolefin film having desirable phosphorescent properties;

To provide an embossable, multilayer, metallized polyolefin film having desirable reflective properties.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of several illustrative embodiments when read in conjunction with the accompanying drawings, wherein:

DETAILED DESCRIPTION

Figure 1:
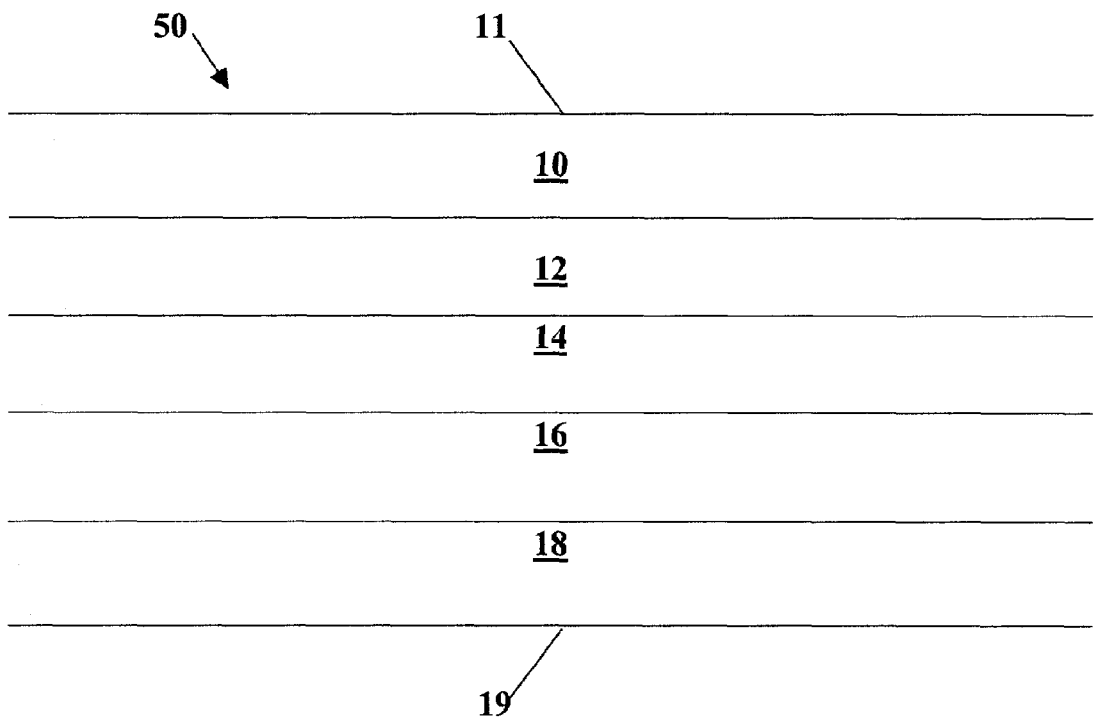
FIG. 1 is a cross sectional view of a five layered embossable film.

FIG. 1 illustrates a cross-sectional view of a five layered film 50. The film 50 is comprised of a first surface 11, a first skin layer 10, a first intermediate or transition layer 12, a core layer 14, a second intermediate or transition layer 16, a second skin layer 18, and a second surface 19.

In one embodiment of a five layered film 50, the first transition layer 12 may comprise an appearance enhancing agent, such as a coloring agent, a phosphorescence producing agent, and/or reflective agent. In another embodiment, the core layer 14 may comprise an appearance enhancing agent, such as a coloring agent, phosphorescence producing agent, and/or reflective agent. This film 50 allows for desirable optical properties on the first surface 11 and or the second surface 19.

In a second embodiment, the first transition layer 12 may comprise a coloring agent, phosphorescence producing agent, and/or reflective agent as in the first embodiment, and the second transition layer 16 may also comprise a coloring agent, phosphorescence producing agent, and/or reflective agent as in the first embodiment. In another embodiment, the core layer 14 may comprise a coloring agent, phosphorescence producing agent, and/or reflective agent. This film 50 allows for desirable optical properties on the first surface 11 and the same or a different set of desirable optical properties on the second surface 19.

A third embodiment may have a first skin layer 10 which may comprise a polyolefin including PP homopolymers, EP copolymers, PB copolymers, EB copolymers, EPB terpolymers, HDPE, LLDPE, MDPE, or EVA copolymer. In one variation of the third embodiment, the first skin layer 10 may be 0.5 to 8 microns thick. The first transition layer 12 may comprise a polyolefin including PP homopolymers, EP random copolymers, PB copolymers, EPB terpolymers, HDPE's, LLDPE's, or MDPE's, and the first transition layer 12 may comprise a coloring agent, phosphorescence producing agent, and/or reflective agent. In another variation, the first transition layer 12 may be 1 to 7 microns thick. In a third variation, the core layer 14 may comprise a polyolefin including polypropylenes, high-density polyethylenes, and linear low-density polyethylenes and may be 5 to 200 microns thick, and the core layer 14 may comprise a coloring agent, phosphorescence producing agent, and/or reflective agent. The second transition layer 16 may comprise a polyolefin including PP homopolymers, EP random copolymers, PB copolymers, EPB terpolymers, HDPE's, LLDPE's, or MDPE's. In another variation, the second transition layer 16 may be 1 to 7 microns thick. The second skin layer 18 may comprise a polyolefin including PP homopolymers, EP copolymers, PB copolymers, EB copolymers, EPB terpolymers, HDPE, LLDPE, MDPE, EVA copolymer, EVOH, or amorphous polyamide. In another variation, the second skin layer 18 may be 0.5 to 8.0 microns thick. In another embodiment, the first surface 11 may be metallized.

A fourth embodiment may have a first skin layer 10 which may comprise a polyolefin including PP homopolymers, EP copolymers, PB copolymers, EB copolymers, EPB terpolymers, HDPE, LLDPE, MDPE, or EVA copolymer. In one variation of the fourth embodiment, the first skin layer 10 is 0.5 to 8 microns thick. The first transition layer 12 may comprise a polyolefin including PP homopolymers, EP random copolymers, PB copolymers, EPB terpolymers, HDPE's, LLDPE's, or MDPE's, and the first transition layer 12 may comprise a coloring agent, phosphorescence producing agent, and/or reflective agent. In another variation, the first transition layer 12 is 1 to 7 microns thick. In a third variation, the core layer 14 may comprise a polyolefin including polypropylenes, high-density polyethylenes, and linear low-density polyethylenes and may be 5 to 200 microns thick, and the core layer 14 may comprise a coloring agent, phosphorescence producing agent, and/or reflective agent. The second transition layer 16 may comprise a polyolefin including PP homopolymers, EP random copolymers, PB copolymers, EPB terpolymers, HDPE's, LLDPE's, or MDPE's, and the second transition layer 16 may comprise a coloring agent, phosphorescence producing agent, and/or reflective agent. In another variation, the second transition layer 16 is 1 to 7 microns thick. The second skin layer 18 may comprise a polyolefin including PP homopolymers, EP copolymers, PB copolymers, EB copolymers, EPB terpolymers, HDPE, LLDPE, MDPE, EVA copolymer, EVOH, or amorphous polyamide. In another variation, the second skin layer 18 is 0.5 to 8 microns thick. In another embodiment, the first surface 11 may be metallized.

Figure 2:
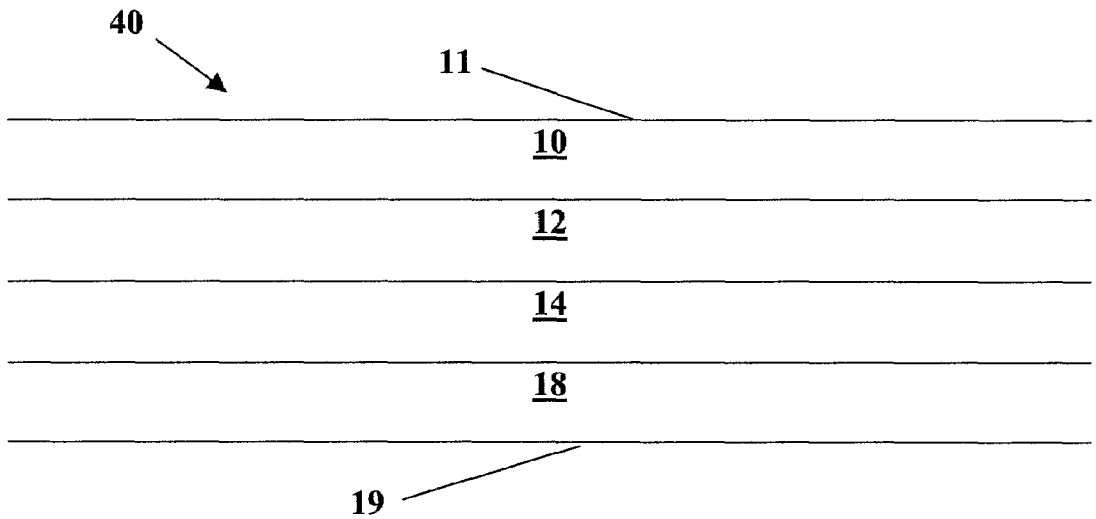
FIG. 2 is a cross sectional view of a four layered embossable film.

Referring now to FIG. 2 is a cross sectional view of a four layered film 40. The film 40 is comprised of a first surface 11, a first skin layer 10, a first transition layer 12, a core layer 14, a second skin layer 18, and a second surface 19.

There are multiple possible embodiments with the four layered film 40. The the first transition layer 12 and/or the core layer 14 may comprise a coloring agent, phosphorescence producing agent, and/or reflective agent to yield desirable optical properties on the first surface 11 and/or the second surface 19. In one embodiment, the first skin layer 10 may comprise a polyolefin. In a second embodiment, the first surface 11 may be metallized.

Figure 3:
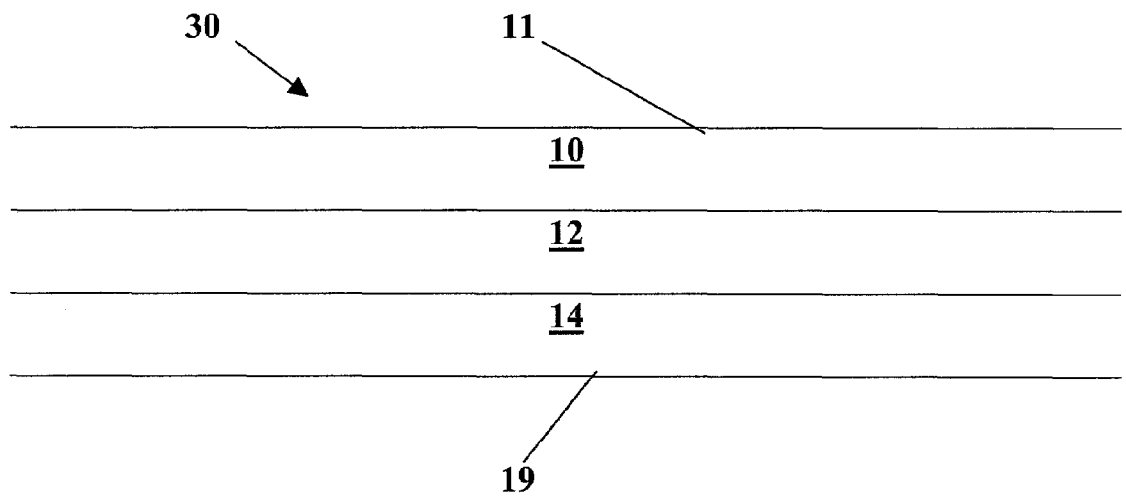
FIG. 3 is a cross sectional view of a three layered embossable film.

Referring now to FIG. 3 is a cross sectional view of a three layered film 30. The film 30 may be comprised of a first surface 11, a first skin layer 10, a first transition layer 12, a core layer 14, and a second surface 19.

In one embodiment of a three layered film 30, the first transition layer 12 may comprise a coloring agent, phosphorescence producing agent, and/or reflective agent. In another embodiment, the core layer 14 may comprise a coloring agent, phosphorescence producing agent, and/or reflective agent. This film 30 allows for desirable optical properties on the first surface 11 and or the second surface 19.

In another embodiment of a three layered film 30, there is a first skin layer 10 which may comprise a polyolefin including PP homopolymers, EP copolymers, PB copolymers, EB copolymers, EPB terpolymers, HDPE, LLDPE, MDPE, or EVA copolymer. In one variation of the second embodiment, the first skin layer 10 is 0.5 to 8 microns thick. The first transition layer 12 may comprise a polyolefin including PP homopolymers, EP random copolymers, PB copolymers, EPB terpolymers, HDPE's, LLDPE's, or MDPE's, and the first transition layer 12 may comprise a coloring agent, phosphorescence producing agent, and/or reflective agent. In another variation, the first transition layer 12 is 1 to 7 microns thick. In a third variation, the core layer 14 may comprise a polyolefin including polypropylenes, high-density polyethylenes, and linear low-density polyethylenes and may be 5 to 200 microns thick, and the core layer 14 may comprise a coloring agent, phosphorescence producing agent, and/or reflective agent. In still another embodiment, the first surface 11 may be metallized.

Figure 4:
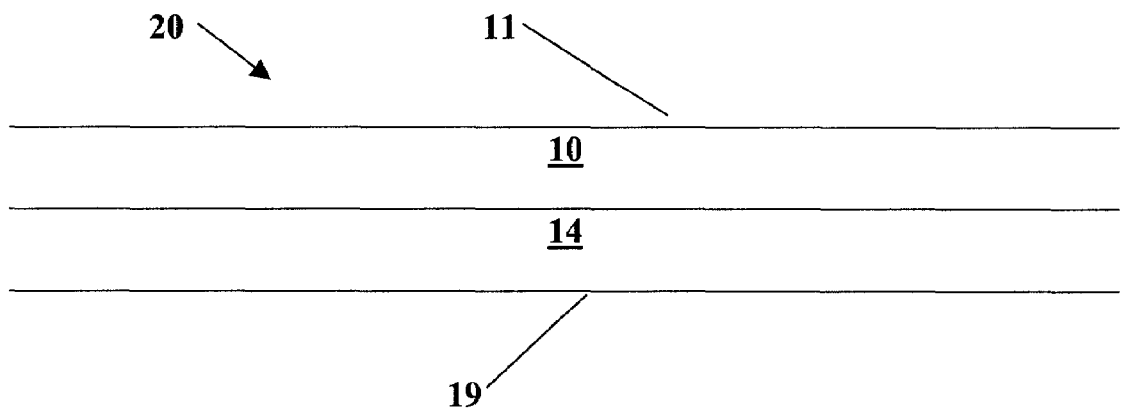
FIG. 4 is a cross sectional view of a two layered embossable film.

Referring to FIG. 4 is a cross sectional view of a two layered film 20. The film 20 may be comprised of a first surface 11, a first skin layer 10, a core layer 14, and a second surface 19.

There are multiple possible embodiments with the two layered film 20. The core layer 14 may comprise a coloring agent, phosphorescence producing agent, and/or reflective agent to yield desirable optical properties on the first surface 11 and/or the second surface 19. In one embodiment, the first skin layer 10 may comprise a polyolefin. In a second embodiment, the first surface 11 may be metallized.

In one embodiment, the first transition layer 12, the core layer 14, and/or the second transition layer 16 of film 50, film 40, film 30, and film 20, comprise a thermoplastic polymeric matrix material which is substantially void free and non-opaque. In another embodiment, the first transition layer 12, the core layer 14, and/or the second transition layer 16 of film 50, film 40, film 30, and film 20, comprise opacifying compounds which may include iron oxides, carbon black, aluminum, $TiO_2$, and talc. It is possible to form an opaque first transition layer 12, core layer 14, and/or second transition layer 16 that may be substantially free of voids where the opacity may be achieved by the addition of opacifying compounds.

As a result of the additions to the first skin layer 10, first transition layer 12, core layer 14, second transition layer 16, and/or second skin layer 18, the film may present a differential appearance. The term "differential" as applied to the film of this invention is intended to convey the concept of the distinctly dissimilar composition and appearance of each exposed film surface: the first surface 11 and the second surface 19. When viewed from the first surface 11, the film can have one set of desirable optical properties. It is contemplated that when the subject film may be used in packaging, the second surface 19 may be positioned on the interior of a package and the first surface 11 may be positioned on the package exterior. When viewed from the second surface 19, the film can also have a set of desirable optical properties different than or the same as the first surface 11. If the film is being used in packaging, and the second surface 19 may be on the interior, then the second surface 19 may be plain white, unprinted and unfinished. But when viewed from the first surface 11, the film may present an appealing appearance desirable for a package exterior.

The polymers contemplated herein for the first skin layer 10, first transition layer 12, second transition layer 16, and second skin layer 18 can be selected from those polymers typically employed in the manufacture of multi-layered films.

In one embodiment, materials which may be used for use for the first skin layer 10 and/or the second skin layer 18 are coextrudable materials which form a seal upon application of elevated temperatures and, at least slight pressure. Examples of polymeric materials which can be used the first skin layer 10 and/or the second skin layer 18 include olefinic homo-, co- or terpolymers. The olefinic monomers can comprise 2 to 8 carbon atoms. Specific examples include polypropylene, ethylene-propylene random copolymer, ethylene-butene-1 copolymer, ethylene-propylene-butene-1 terpolymer, propylene-butene copolymer, high density polyethylene, low density polyethylene, linear low density polyethylene, very low density polyethylene, metallocene-catalyzed polyethylene, metallocene-catalyzed polymers known by the term plastomer, metallocene-catalyzed ethylene-hexene copolymer, metallocene-catalyzed ethylene-butene copolymer, metallocene-catalyzed ethylene-octene copolymer, ethylene-methacrylic acid copolymer, ethylene-vinyl acetate copolymer (EVA), ethylene-vinyl alcohol copolymer (EVOH), amorphous polyamide, and ionomer resin. A blend of the foregoing materials is also contemplated such as a blend of the plastomer and ethylene-butene copolymer.

In another embodiment, suitable examples of olefin polymers that may be used for the embossable first skin layer 10 include, but are not limited to, ethylene-propylene-butylene (EPB) terpolymers, ethylene-propylene (EP) copolymers, metallocene catalyzed polyethylenes, syndiotactic polypropylenes, propylene-butylene random copolymers, and blends of any of the above components, with or without isotactic polypropylene homopolymer. In one embodiment, the olefin polymer of the embossable first skin layer 10 may be an EPB terpolymer or an EP copolymer. The preferred comonomer contents of the EPB terpolymer may be, e.g., about 0.5 to about 5% ethylene and about 1.0 to about 23% butylene, while the preferred comonomer content of the EP copolymer may be, e.g., about 2.0 to about 8.0% ethylene. The metallocene-catalyzed polyethylene may have a density of from about 0.910 to about 0.940 $g/cm^3$. Commercially useful EPB terpolymer materials include, but are not limited to, CHISSO XPM 7701, which contains an EPB terpolymer having 4% by weight of ethylene and 4% by weight of butylene and 2300 ppm of SYLOBLOC 44 silica antiblocking agent. Other EPB terpolymers include WS709N sold by Sumitomo, in which the comonomer contents are 1% by weight ethylene and 16% butylene. As for the EP copolymer, FINA 8573 having an ethylene content of 3.55% by weight may be used.

In another embodiment, the olefin polymer of the second skin layer 18 may be selected from a wide variety of polymeric materials, but could be capable of providing a high energy surface for further converting steps after optional metallization. Examples of such olefin polymers useful for the additional second skin layer 18 include, but are not limited to, a high density polyethylene (HDPE), a polypropylene homopolymer, an EPB terpolymer, medium density polyethylene (MDPE), amorphous polyamide, EVOH copolymer, an EP copolymer, a propylene-butylene copolymer (e.g., a butylene content of 2.0 to 12.0% by weight), a linear low density polyethylene (LLDPE), or a blend of any of these materials.

In one embodiment, the second skin layer 18 comprises HDPE. The contemplated HDPE materials include polyethylenes having a density of about 0.950 or greater, and include the HDPE resins disclosed in U.S. Pat. No. 4,870,122 to Lu, which is incorporated herein by reference in its entirety. Commercially useful HDPE resins include, but are not limited to, EXXON HD 6704.67 sold by Exxon.

The core 14, first transition layer 12, and/or second transition layer 16 of the present invention may be any one of the coextrudable, biaxially orientable film-forming resins known in the art. Such materials include, but are not limited to, isotactic polypropylene high density polyethylene, low density polyethylene, linear low density polyethylene, very low density polyethylene, metallocene-catalyzed polyethylene and polypropylene, metallocene-catalyzed polymers known by the term plastomer, maleic anhydride grafted polypropylene, syndiotactic polypropylene, propylene copolymers and terpolymers which include other monomers such as ethylene and/or butene-1, ethylene copolymers and terpolymers which include other monomers such as propylene and/or butene-1. Typical copolymers are ethylene-propylene copolymers, ethylene-butene-1 copolymers, butene-1-propylene random copolymers, and ethylene-propylene block copolymers. Typical terpolymers are ethylene-propylene-butene-1 terpolymers. Alternative and useful thermoplastic materials include, but are not limited to nylon, polyester, ethylene-vinyl acetate copolymer, and ethylene-vinyl alcohol copolymer. Blends of any of the foregoing homopolymers, copolymers and terpolymers are contemplated. One embodiment uses an isotactic polypropylene containing at least about 80% by weight of isotactic polypropylene, wherein it is preferred that the polypropylene have a melt flow index of from about 2 to 10 g/10 min. Another embodiment uses a high-density polyethylene, with a density of 0.95 or greater. Another embodiment uses a LLDPE with a density of about 0.9 to about 0.95.

The core layer 14 of the cast or oriented film of the present invention may comprise a propylene polymer. In the present invention, the term "propylene polymer" includes homopolymers as well as copolymers of propylene. Preferably, however, the propylene polymer may be a polypropylene homopolymer. In one embodiment, the propylene polymer of the core layer 14 may have an isotacticity ranging from about 80 to about 100%, and in another embodiment from about 95 to about 96%, as measured by $^{13}$C NMR spectroscopy using meso pentads. Further, the propylene polymer of the core layer 14 may have a melt index ranging from about 2 to about 10 g/10 minutes, and in another embodiment from about 3 to about 6 g/10 minutes, as measured according to ASTM D1238 at 190° C. under a load of 5 lbs. Commercially available propylene polymers for the core layer 14 include, but are not limited to, FINA 3371, which is an isotactic polypropylene homopolymer sold by Fina Oil and Chemical Company.

Ethylene-propylene-butene-1 random terpolymers appropriate for use in the core 14 of the present invention include those containing 1-6 weight percent random ethylene and 3-25 weight percent random butene-1, with the balance being made up of propylene. The amounts of the random ethylene and butene-1 components in these terpolymers are typically in the range of 4 to 31 weight percent (ethylene plus butene-1) based on the total amount of the copolymer.

The copolymers and terpolymers typically have a melt flow rate in the range of about 1.5 to 15 g/10 min, with a density of about 0.9 and a melting point in the range of about 115 to about 170° C.

In one embodiment, the exposed first surface 11 and/or second surface 19 are treated in a known and conventional manner, e.g., by flame, plasma, or corona discharge to improve its receptivity to inks and/or its suitability for such subsequent manufacturing operations as lamination.

In one embodiment, the exposed treated or untreated first surface 11 and/or second surface 19 have applied to it, coating compositions or substrates such as another polymer film or laminate; a metal foil such as aluminum foil; cellulosic webs, e.g. numerous varieties of paper such as corrugated paperboard, craft paper, glassine, cartonboard; nonwoven tissue, e.g., spunbonded polyolefin fiber, melt-blown microfibers, etc. The application may employ a suitable adhesive, e.g., a hot melt adhesive such as low density polyethylene, ethylene-methacrylate copolymer, water-based adhesive such as polyvinylidene chloride latex, and the like. In an alternate embodiment, the film of the present invention may be laminated to another polyolefin film (eg: thermal, adhesive, extrusion, etc).

In one embodiment, the first transition layer 12, the core layer 14, and/or the second transition layer 16 includes up to about 30% by wt., in another embodiment from about 2% to about 20% by wt., and in a third embodiment from about 3% to about 10% by wt. of a coloring agent. U.S. Pat. Nos. 5,894,048; 4,894,264; 4,536,184; 5,683,805; 5,328,743; and 4,681,803 disclose the use of coloring agents, the disclosures of which are incorporated herein by reference in their entirety. Suitable coloring agents include pigments and dyes. In one embodiment, pigments and dyes include organic pigments and dyes such as phthalocyanine, azo, condensed azo, azo lake, anthraquinone, perylene/perinone, indigo/thioindigo, isoindolinone, azomethineazo, dioxazine, quinacridone, aniline black, triphenylmethane and carbon black pigments; and inorganic pigments and dyes such as titanium oxide, iron oxide, iron hydroxide, chrome oxide, spinel-form calcination type, chromic acid, talc, chrome vermilion, iron blue, aluminum powder and bronze powder pigments. These pigments may be provided in any form or may be subjected in advance to various dispersion treatment in a manner known per se in the art. Depending on the material to be colored, the coloring agent can be added with one or more of various additives such as organic solvents, film-forming resins (in not a large proportion), flame retardants, antioxidants, ultraviolet absorbers, plasticizers and surfactants. Colored compounded thermoplastics which are commercially available may also be used with this invention, although direction addition of a dye or pigment to the extrusion is possible. In another embodiment colored compounded thermoplastic concentrates are used. (For example from Schulman: Polybatch Blue P4021, Polybatch Blue P4535, Polybatch Red P50346, Polybatch Yellow P2214F, Polybatch Green P3510F, Polybatch Brown P1028F, and Polybatch Orange P10307; from Ampacet: LR-92396 (blue), LR-92011 (blue), LR-92397 (green), LR-92398 (yellow), and LR-92010 (red); from Milliken Clear Tint Blue 9805, Clear Tint Red 9803, Clear Tint Amber 9808, and Clear Tint Green 9807.) In a third embodiment colored compounded thermoplastic concentrates contain lower amounts of titanium dioxide or are otherwise lower in opacity. Furthermore, a color on the first surface 11 or second surface 19 of the film allows printing of laminated or unlaminated structures without requiring a base colored ink.

In a second embodiment, the first transition layer 12, the core layer 14, and/or the second transition layer 16 includes up to about 50% by wt., in another embodiment from about 2% to about 30% by wt., and in a third embodiment from about 5% to about 15% by wt. of a phosphorescence producing agent. Phosphorescent compounded thermoplastics that are commercially available may also be used with this invention, although direction addition of a dye or pigment to the extrusion is possible. In another embodiment phosphorescent compounded thermoplastic concentrates are used. (For example masterbatches may include Schulman Phos 440, with the addition of a typical glow in the dark color (in another layer) such as Schulman Polybatch Greenglow P30335 or Polybatch Blueglow P40457.)

In a third embodiment, the first transition layer 12, the core layer 14, and/or the second transition layer 16 includes up to about 50% by wt., in another embodiment from about 2% to about 30% by wt., and in a third embodiment from about 5% to about 15% by wt. of a reflective agent. Suitable reflective agents include glass beads or microspheres, and cube-corner reflectors molded from glass and acylic resins or oligomers. Cube-corner reflectors are disclosed in U.S. Pat. No. 6,120,636, which is incorporated herein by reference in its entirety.

The first skin layer 10 and the second skin layer 18 may be heat sealable or non-heat sealable. In one embodiment, if the second skin layer 18 is not heat sealable, then a heat sealable coating layer (not shown) may be applied to the second skin layer 18. In another embodiment, if the first skin layer 10 is not heat sealable, then a heat sealable coating layer (not shown) may be applied to the first skin layer 10. A heat sealable coating layer (not shown) may be, for example, vinylidene chloride polymer or an acrylic polymer. Vinylidene chloride polymer or acrylic polymer may also be applied to the exposed second surface 19.

In another embodiment, if the second skin layer 18 is heat sealable, it can be fabricated from any of the heat sealable copolymers, blends of homopolymers and blends of copolymer(s) and homopolymer(s) heretofore employed for this purpose. Illustrative of heat sealable copolymers which can be used for the second skin layer 18 of the present film are ethylene-propylene copolymers containing from about 1.5 to about 12, and alternatively from about 3 to about 7 weight percent ethylene, and ethylene- propylene-butene terpolymers containing from about 1 to about 10, and alternatively from about 1 to about 6 weight percent ethylene and from about 70 to about 97% propylene. In another embodiment, heat sealable blends of homopolymer can be utilized for the second skin layer 18 which include from about 1 to about 99 weight percent polypropylene homopolymer, e.g., one which is the same as, or different from, the polypropylene homopolymer constituting core layer 14 blended with from about 99 to about 1 weight percent of a linear low density polyethylene (LDPE). If the second skin layer 18 is heat-sealable, corona or flame treatment of that layer is optional.

In another embodiment, heat sealable blends of copolymer(s) and homopolymer(s) which may be used for the second skin layer 18 include: a blend of from about 5 to about 19 weight percent of polybutylene and from about 95 to about 81 weight percent of a copolymer of propylene (80 to about 95 mole percent) and butylene (20 to about 5 mole percent); a blend of from about 10 to about 90 weight percent of polybutylene and from about 90 to about 10 weight percent of a copolymer of ethylene (2 to about 49 mole percent) and a higher olefin having 4 or more carbon atoms (98 to about 51 mole percent); a blend of from about 10 to about 90 weight percent polybutylene and from about 90 to about 10 weight percent of a copolymer of ethylene (10 to about 97 mole percent) and propylene (90 to about 3 mole percent); and, a blend of from about 90 to about 10 weight percent of polybutylene, and from about 10 to about 90 weight percent of a copolymer of propylene (2 to about 79 mole percent) and butylene (98 to about 21 mole percent).

In one embodiment, the first skin layer 10, first transition layer 12, core layer 14, second transition layer 16, and/or second skin layer 18 are coextruded. Thereafter, the film may be uniaxially or biaxially oriented. For example, when the core layer 14 comprises polypropylene, a machine direction orientation may be preferably from about 4 to about 8 and a transverse orientation may be preferably from 4 to about 10 times at a drawing temperature of about 100 degrees C. to about 170 degrees C. to yield a biaxially oriented film.

In another embodiment the first skin layer 10 and/or the second skin layer 18 may have a coating or metal layer applied. U.S. Pat. Nos. 6,077,602; 6,013,353; 5,981,079; 5,972,496; 6,074,762; 6,025,059; and 5,888,648 disclose the use of coatings and/or metal layers on a film, and are disclosed herein by reference in their entirety. In one embodiment, suitable coatings may include PVdC's, PVOH, EMA, EAA, epoxy, polyester, or acrylics which serve to boost gloss, enhance machineability, barrier properties; scuff resistance; and/or enhance ink adhesion; suitable metals may include aluminum.

The first skin layer 10 and/or the second skin layer 18 of this invention may also include a particular polydialkylsiloxane additive. In one embodiment of the invention, first skin layer 10, first transition layer 12, second transition layer 16 and/or the second skin layer 18 are compounded with an amount of a polydialkylsiloxane sufficient to reduce friction when the film may be formed or when it may be manipulated in packaging machinery.

Sometimes it is useful to enhance film properties or provide the film with certain properties by use of appropriate film additives. Such additives are used in effective amounts, which vary depending upon the property required, and are, typically selected from the group consisting of: antiblock, slip additive, antioxidant additive, moisture barrier additive or gas barrier additive. These additives may be included in any of the film's layers. Useful antistatic additives which can be used in amounts ranging from about 0.05 to about 3 weight %, based upon the weight of the layer, include alkali metal sulfonates, polyether-modified polydiorganosiloxanes, polyalkylphenylsiloxanes and tertiary amines. Useful antiblock additives used in amounts ranging from about 0.1 weight % to about 3 weight % based upon the entire weight of the layer include inorganic particulates such as silicon dioxide, e.g. a particulate antiblock sold by W. R. Grace under the trademark "Sylobloc 44," calcium carbonate, magnesium silicate, aluminum silicate, calcium phosphate, and the like, e.g., KAOPOLITE. Another useful particulate antiblock agent is referred to as a non-meltable crosslinked silicone resin powder sold under the trademark "TOSPEARL" made by Toshiba Silicone Co., Ltd. and is described in U.S. Pat. No. 4,769,418. Another useful antiblock additive is a spherical particle made from methyl methacrylate resin having an average diameter of 1 to 15 microns, such an additive may be sold under the trademark "EPOSTAR" and may be commercially available from Nippon Shokubai. Typical slip additives include higher aliphatic acid amides, higher aliphatic acid esters, waxes and metal soaps which can be used in amounts ranging from about 0.1 to about 2 weight percent based on the total weight of the layer. A specific example of a useful fatty amide slip additive may be erucamide. Useful antioxidants are generally used in amounts ranging from about 0.1 weight % to about 2 weight percent, based on the total weight of the layer, phenolic antioxidants. One useful antioxidant may be commercially available under the trademark "Irganox 1010". Barrier additives may be used in useful amounts and may include low-molecular weight resins, hydrocarbon resins, particularly petroleum resins, styrene resins, cyclopentadiene resins and terpene resins. Optionally, one or more of the film's layers may be compounded with a wax for lubricity. Amounts of wax range from about 2 to about 15 weight % based on the total weight of the layer. Any conventional wax useful in thermoplastic films may be contemplated.

In another embodiment, the film structure, in particular the core layer 14 of the structure, should be free or substantially free from migratory additives (e.g., fatty acid amides, antistats, etc.) that can subsequently deposit residues on the embossing machine, interfere with the metallization step, or detrimentally affect the appearance of the final film. However, in order to modify or enhance certain properties of the multi-layer films of the present invention for specific end-uses, it may be possible for one or more of the layers to contain appropriate additives, including migratory additives, in effective amounts. Such additives are further described in U.S. Pat. No. 5,254,394, which is incorporated herein by reference in its entirety.

In the present invention, the overall thickness of the film may be in one embodiment from about 40 to about 500 gauge units, and in a second embodiment from about 50 to about 200 gauge units. In one embodiment, the first skin layer 10 may be from about 0.5 to about 8.0 gauge units, in a second embodiment between about 2.0 and about 6.0 gauge units, and in a third embodiment about 4 gauge units. In one embodiment, the second skin layer 18 may have a thickness of from about 0.5 to about 8.0 gauge units, and in a second embodiment between about 2.0 and about 4.0 gauge units.

The multi-layer films of the present invention may be prepared employing commercially available systems. In one embodiment, all the layers of the multi-layer film structures of the present invention are coextruded. Thereafter, the film may be uniaxially or biaxially oriented. Specifically, the polymers are brought to the molten state and coextruded from a conventional extruder through a flat sheet die, wherein the melt streams are combined in an adapter prior to being extruded from the die or within the die. After leaving the die, the multi-layer film may be chilled and the quenched sheet may be reheated and oriented.

In one embodiment, the film may be oriented by biaxially stretching the film. The film may be oriented by stretching from about 3.5 to about 6.5 times in the machine direction at temperatures ranging from about 215° F. to about 300° F. and from about 5 to about 14 times in the transverse direction (TD) at temperatures ranging from about 300° F. to about 380° F.

Subsequently, the oriented film may be heated, embossed, optionally treated, optionally slit, and then optionally metallized to produce a final film having a decorative, prismatic or holographic appearance. One method of producing the final film with a decorative, prismatic or holographic appearance comprises optionally heating the embossable surface of the film to soften it, embossing the surface under pressure with an engraved roll that leaves a mirror image of the roll's image on the film, and subsequently metallizing the embossed surface to give the film its unique appearance.

In one embodiment, the first skin layer 10, core layer 14, and/or second skin layer 18 may be embossed. In another embodiment, the embossing method for use in the present invention may be known as "soft embossing." Soft embossing is a process by which the film may be embossed at a pressure of about 200 psi so as to emboss only one side of the film and leave the opposite side of the film essentially untouched. In another embodiment, a method known as "hard embossing" may also be used. Unlike soft embossing, hard embossing may be performed at about 1000 psi and, in general, the embossing can extend all the way through the film. Thus, all the layers of the film of the present invention may be soft enough to be embossed. In another embodiment, the olefin polymer of the embossable first skin layer 10, in layer form, may be capable of being soft embossed at temperatures between about 230° F. and about 280° F. and a pressure of about 200 psi to about 400 psi, or hard embossed at room temperature to about 150° F. and a pressure of about 600 psi to about 1000 psi, or variations thereof.

Alternatively, other embossing methods may also be used in the present invention. For example, an alternative embossing method may include coating a pattern on the embossable side of the film. Such an embossed surface of the film may then be metallized.

In one aspect of the present invention, the embossing step may be incorporated in the orientation machine between the TDO exit and the corona discharge or flame treater section via a series of preheat rolls and an embossing roll. The advantage of such an embodiment may be that a much more cost-effective process for embossing the film may be provided. Specifically, this embodiment would eliminate the extra steps of embossing and then treating the embossed surface. It provides an efficient method in which embossing may be performed while the film is being made.

For instance, after the film is coextruded and drawn in the MD and TD directions, the embossing can take place after the TDO ovens but before plasma, corona, or flame treaters. This permits the completion of all steps of the film production process using one machine. The film could be made, oriented, embossed, and then treated. The film can then be metallized, saving the extra out-of-line process steps before metallization.

Alternatively, the embossing step may be incorporated in a cast machine between the caster and the corona discharge, plasma, or flamer treater section via a series of optional preheat rolls and an embossing roll. The embossed, cast polyolefin film of the present invention may be made by a similar process as compared to the oriented films, except the cast film may be made by pouring, spreading, or extruding the molten polymeric material onto a temporary carrier, solidifying the material by any suitable means, and removing it from the carrier. Such cast film production methods are known in the art, and include the well-known chill roll cast process, but other methods can be used.

In an alternative embodiment, the embossing and treating of the embossed first skin layer 10 are incorporated into the slitting process. The slitting process may be where master rolls produced on the orienter or casting machine are cut and rewound into narrower rolls for further processing (metallizing) or directly for shipment to customers on a machine known as a slitter. A series of preheated rolls are positioned after the unwind stand of the slitter to preheat the film to the necessary temperature for embossing. This may be followed by an embossing roll to engrave the embossable surface of the film with the appropriate pattern. This may be followed by a plasma, corona, or flame treater also positioned on the slitter between the unwind and rewind section to treat the embossed surface layer to a surface tension to readily accept aluminum. The embossed and treated film would be finally subsequently slit and rewound to the appropriate width for further processing (metallizing) or direct shipment to the customer. The incorporation of the embossing and treating in the slitting process also provides the advantage of a more cost-effective process for embossing the film by combining process steps together.

Other embossing processes and methods are known in the art and contemplated for use in this invention.

The metallizing step in the production of the film may be accomplished using any of the techniques known in the art, such as vacuum metallization of aluminum. The metal may be deposited on at least one outermost surface of the aforementioned embossable, multilayer polyolefin film structures or on the embossed first skin layer of the aforementioned embossed, multilayer polyolefin film structures.

Although various embodiments have been disclosed for the five layer film 50, three layer film 30, four layer film 40, and two layer film 20, additional embodiments of films with three or more layers are possible by interchanging elements of coloring, phosphorescent, and/or reflective agents, polyolefins, and inorganic and organic additives that would be clear to one with ordinary skill in the art.

The following examples illustrate the present invention without limiting the scope thereof.

EXAMPLES

Two films, each having an "DCABE" type structure, were produced. In each film, the total thickness of the film was 80 gauge units. Layers D, A, and E represent the additional outer layer, the core layer, and the embossed outer layer, respectively. In each film, layer D had a thickness of 2.3 gauge units, layer A had a thickness of 49.7 gauge units, and layer E had a thickness of 4 gauge units. In addition, the film had two intermediate layers C and B of 12 gauge units each on Example 1, and 16 and 8 gauges respectively on Example 2.

Example 1

Layers D (additional outer layer), A (core layer), E (embossed outer layer), and C and B (additional transitional layers) were melt coextruded through a die using three extruders working in association at 470° F., 485° F., and 460° F., respectively. Layer D was made from a composition containing EXXON HD 6704.67 HDPE resin and 780 ppm SYLOBLOC 45 silica antiblock agent. Layer A was made from FINA 3371 polypropylene homopolymer. Layer E was made from SUMITOMO SPX78F9, an EPB terpolymer (about 15% butene and about 1.5% ethylene). Layers C and B were made from a compound of 50% FINA 3371 and 50% Ampacet Blue LR-92010. The die temperature was maintained at 485° F.

The coextruded film was then quenched using a water bath maintained at 100° F. The coextruded film was then oriented oriented in the machine direction about 4.6 times at 245° F., and about 9 times in the transverse direction at 336° F.

Following orientation, the film was flame treated on the HDPE side to provide surface offline level of about 40 to about 45 dynes/cm and then rolled. The film in roll form was thereafter run on the embossing machine, in which the line speed was 150 feet/minute. The film had approximately ⅝'s wrap on about a 10" diameter hot roll to soften the embossable side. The temperature of the hot roll was maintained at about 240° F. to about 265° F. After the film was heated on the hot roll, the film was then embossed between the embossing roll and and EPDM rubber or similar nip. The pressure of the embossing roll was about 200 psi. This operation forms the image or pattern on the embossable surface of the film.

The embossed side of the film was then corona treated to improve the adhesion of metal from the metallization step. Lastly, the film was vacuum metallized using aluminum to give a unique appearance.

The final film produced had a shiny, metallic appearance over the embossed surface. In addition, looking through the film from the unembossed side, the film achieved a metallic tinted blue color with the additional prismatic effect from embossing.

Example 2

Example 1 was repeated, except the EPB terpolymer of Layer E was replaced with SUMITOMO WS709N, a similar EPB terpolymer (about 15% butene and about 1.5% ethylene). Layer D was changed to Ampacet 6030 HDPE resin. Transition layer C was also changed to 16 gauge units of a compound of 25% Fina 3371 and 75% Schulman Polybatch PHOS 440, and Transition layer B was changed to 8 gauge units of 25% Fina 3371 and 75% of Schulman Polybatch Greenglow P30335.

The film went through the same process steps as Example 1 and the final film produced in this example also had a shiny, metallic appearance over the embossed surface. In addition the PHOS 440 over the greenglow color resulted in a typical phosphorescent greenish glowing color on the opposite side.

80 Gauge Total Thickness

Example 1

D 2.3 gauge—Exxon HD6704.67
C 12 gauge—50% Fina 3371/50% AmpacetLR-92010 blue
A 49.7 gauge—Fina 3371
B 12 gauge—50% Fina 3371/50% Ampacet LR-92010 blue
E 4.0 gauge Sumitomo SPX78F9

Example 2

D 2.3 gauge—Ampacet 6030
C 15 gauge—25% Fina 371/75% Schulman Polybatch 440
A 49.7 gauge—Fina 3371
B 8 gauge—25% Fina 3371/75% Schulman Polybatch P30335 greenglow
E 4.0 gauge Sumitomo SPX78F9

We claim:

1. An embossed, cast, co-extruded polyolefin film or an embossed, bi-axially oriented, co-extruded polyolefin film comprising:
   (a) a core layer comprising an olefin polymer, said core layer is substantially void-free and non-opaque and includes an agent selected from the group consisting of phosphorescence producing agents, reflective agents, coloring agents, and blends thereof; and
   (b) an embossed outer layer located on a side of said core layer, said embossed outer layer comprising an olefin polymer; and
   (c) a metallized outermost surface on said embossed outer layer;
   wherein said final film has a differential appearance of holographic or prismatic images comprising (i) a shiny silver metallic appearance when said final film is viewed from the metallized outermost surface, and (ii) a metallic tinted colored appearance, a metallic reflective appearance or a metallic phosphorescent appearance, when said final film is viewed through the core layer.

2. The film according to claim 1, further comprising:
   (c) an additional outer layer on a side of said core layer opposite to said embossed outer layer, said additional outer layer comprising an olefin polymer.

3. The film according to claim 2, further comprising:
   (d) a first transition layer on a side of said additional outer layer between said additional outer layer and said core layer, said first transition layer comprising an olefin polymer and including an agent selected from the group consisting of coloring agents, phosphorescence producing agents, reflective agents, and blends thereof.

4. The film according to claim 1, wherein the olefin polymer of the core layer is selected from the group consisting of propylene homopolymers, copolymers and terpolymers, high density polyethylene (HDPE), low density polyethylene (LDPE), linear low density polyethylene (LLDPE), very low density polyethylene (VLDPE), isotactic polypropylene, syndiotactic polypropylene, and blends thereof.

5. The film according to claim 1, wherein the olefin polymer of the embossed outer layer is selected from the group consisting of polypropylenes, including syndiotactic and isotactic polypropylene, ethylene-propylene-butylene (EPB) terpolymers, ethylene-propylene (EP) copolymers, propylene-butylene random copolymers, and blends thereof.

6. The film according to claim 2, wherein the olefin polymer of the additional outer layer is selected from the group consisting of polyethylenes, high density polyethylenes (HDPE), medium density polyethylenes (MDPE), linear low density polyethylenes (LLDPE), propylene homopolymers, EPB terpolymers, EP copolymers, propylene-butylene copolymers, amorphous polyamides, EVOH copolymers, and blends thereof.

7. The film according to claim 3, wherein said agent of said first transition layer is selected from the group consisting of coloring agents, phosphorescence producing agents, reflective agents, and blends thereof in said first transition layer is the same as said agent in said core layer.

8. The film according to claim 3, wherein said agent of said first transition layer is selected from the group consisting of coloring agents, phosphorescence producing agents, reflective agents, and blends thereof in said first transition layer is different from said agent in said core layer.

9. The film according to claim 2, wherein at least one of the embossed outer layer and the additional outer layer are flame, plasma or corona discharge treated.

10. An embossed, cast, co-extruded polyolefin film or an embossed, bi-axially oriented, co-extruded polyolefin film comprising:
   (a) a core layer comprising an olefin polymer;
   (b) a first transition layer on a side of said core layer, said first transition layer comprising an olefin polymer; and
   (c) an embossed outer layer on a side of said transition layer opposite to said core layer, said embossed outer layer comprising an olefin polymer capable of being embossed; and
   (d) a metallized outermost surface on said embossed outer layer;
      wherein said first transition layer is substantially void-free, non-opaque and includes an agent selected from the group consisting of coloring agents, phosphorescence producing agents, reflective agents, and blends thereof;
      wherein said final film has a differential appearance of holographic or prismatic images comprising (i) a shiny silver metallic appearance when said final film is viewed from the metallized outermost surface, and (ii) a metallic tinted colored appearance, a metallic reflective appearance or a metallic phosphorescent appearance, when said final film is viewed through the core layer.

11. The film according to claim 10, wherein the olefin polymer of the core layer is selected from the group consisting of propylene homopolymers, copolymers and terpolymers, high density polyethylene (HDPE), low density polyethylene (LDPE), linear low density polyethylene (LLDPE), very low density polyethylene (VLDPE), isotactic polypropylene, syndiotactic polypropylene, and blends thereof.

12. The film according to claim 10, wherein the olefin polymer of the embossed outer layer is selected from the group consisting of polypropylenes, including syndiotactic and isotactic polypropylene, ethylene-propylene-butylene (EPB) terpolymers, ethylene-propylene (EP) copolymers, propylene-butylene random copolymers, and blends thereof.

13. The film according to claim 10, wherein said core layer includes an agent selected from the group consisting of phosphorescence producing agents, reflective agents, coloring agents, and blends thereof, and wherein said agent in said first transition layer is the same as said agent in said core layer.

14. The film according to claim 10, wherein said core layer includes an agent selected from the group consisting of phosphorescence producing agents, reflective agents, coloring agents, and blends thereof, and wherein said agent in said first transition layer is different from said agent in said core layer.

15. The film according to claim 10, wherein at least one of said embossed outer layer or said core layer is flame, plasma or corona discharge treated.

16. An embossed, cast, co-extruded polyolefin film or an embossed, bi-axially oriented, co-extruded polyolefin film comprising:
   (a) a core layer comprising an olefin polymer;
   (b) a first transition layer on a side of said core layer, said first transition layer comprising an olefin polymer;
   (c) an embossed outer layer on a side of said transition layer opposite to said core layer, said embossed outer layer comprising an olefin polymer capable of being embossed; and
   (d) an additional outer layer on a side of said core layer opposite to said first transition layer, said additional outer layer comprising an olefin polymer; and
   (e) a metallized outermost surface on said embossed out layer;
      wherein said first transition layer is substantially void-free, non-opaque and includes an agent selected from the group consisting of coloring agents, phosphorescence producing agents, reflective agents, and blends thereof;
      wherein said final film has a differential appearance of holographic or prismatic images comprising (i) a shiny silver metallic appearance when said final film is viewed from the metallized outermost surface, and (ii) a metallic tinted colored appearance, a metallic reflective appearance or a metallic phosphorescent appearance, when said final film is viewed through the core layer.

17. The film according to claim 16, wherein the olefin polymer of the core layer is selected from the group consisting of propylene homopolymers, copolymers and terpolymers, high density polyethylene (HDPE), low density polyethylene (LDPE), linear low density polyethylene (LLDPE), very low density polyethylene (VLDPE), isotactic polypropylene, syndiotactic polypropylene, and blends thereof.

18. The film according to claim 16, wherein the olefin polymer of the embossed outer layer is selected from the group consisting of polypropylenes, including syndiotactic and isotactic polypropylene, ethylene-propylene-butylene (EPB) terpolymers, ethylene-propylene (EP) copolymers, propylene-butylene random copolymers, and blends thereof.

19. The film according to claim 16, wherein the olefin polymer of the additional outer layer is selected from the group consisting of polyethylenes, high density polyethylenes (HDPE), medium density polyethylenes (MDPE), linear low density polyethylenes (LLDPE), propylene homopolymers, EPB terpolymers, EP copolymers, propylene-butylene copolymers, amorphous polyamides, EVOH copolymers, and blends thereof.

20. The film according to claim 16, wherein said core layer includes an agent selected from the group consisting of phosphorescence producing agents, reflective agents, coloring agents that are non-opaque producing pigments and dyes, and blends thereof, and wherein said agent in said first transition layer is the same as said agent in said core layer.

21. The film according to claim 16, wherein said core layer includes an agent selected from the group consisting of phosphorescence producing agents, reflective agents, coloring agents that are non-opaque producing pigments and dyes, and blends thereof, and wherein said agent in said first transition layer is different from said agent in said core layer.

22. The film according to claim 16, wherein at least one of the embossed outer layer and the additional outer layer are flame, plasma or corona discharge treated.

23. An embossed, cast, co-extruded polyolefin film or an embossed, bi-axially oriented, co-extruded polyolefin film comprising:
(a) a core layer comprising an olefin polymer;
(b) a first transition layer on a side of said core layer, said first transition layer comprising an olefin polymer;
(c) an embossed outer layer on a side of said first transition layer opposite to said core layer, said embossed outer layer comprising an olefin polymer capable of being embossed;
(d) a second transition layer on a side of said core layer opposite to said first transition layer, said second transition layer comprising an olefin polymer; and
(e) an additional outer layer on a side of said second transition layer opposite to said core layer, said additional outer layer comprising an olefin polymer; and
(f) a metallized outermost surface on said embossed out layer,
wherein at least one of said first transition layer and said second transition layer are substantially void-free, non-opaque and includes an agent selected from the group consisting of coloring agents, phosphorescence producing agents, reflective agents, and blends thereof;
wherein said final film has a differential appearance of holographic or prismatic images comprising (i) a shiny silver metallic appearance when said final film is viewed from the metallized outermost surface, and (ii) a metallic tinted colored appearance, a metallic reflective appearance or a metallic phosphorescent appearance, when said final film is viewed through the core layer.

24. The film according to claim 23, wherein the olefin polymer of the core layer is selected from the group consisting of propylene homopolymers, copolymers and terpolymers, high density polyethylene (HDPE), low density polyethylene (LDPE), linear low density polyethylene (LLDPE), very low density polyethylene (VLDPE), isotactic polypropylene, syndiotactic polypropylene, and blends thereof blends thereof.

25. The film according to claim 23, wherein the olefin polymer of the embossed outer layer is selected from the group consisting of polypropylenes, including syndiotactic and isotactic polypropylene, ethylene-propylene-butylene (EPB) terpolymers, ethylene-propylene (EP) copolymers, propylene-butylene random copolymers, and blends thereof.

26. The film according to claim 23, wherein the olefin polymer of the additional outer layer is selected from the group consisting of polyethylenes, high density polyethylenes (HDPE), medium density polyethylenes (MDPE), linear low density polyethylenes (LLDPE), propylene homopolymers, EPB terpolymers, EP copolymers, propylene-butylene copolymers, amorphous polyamides, EVOH copolymers, and blends thereof.

27. The film according to claim 23, wherein both said first transition layer and said second transition layer include an agent selected from the group consisting of coloring agents, phosphorescence producing agents, reflective agents, and blends thereof, and wherein said agents in said at least two layers are the same agent.

28. The film according to claim 23, wherein both said first transition layer and said second transition layer include an agent selected from the group consisting of coloring agents, phosphorescence producing agents, reflective agents, and blends thereof, and wherein said agents in said at least two layers are different agents.

29. The film according to claim 23, wherein at least one of the embossed outer layer and the additional outer layer are flame, plasma or corona discharge treated.

30. A process for producing an embossed polyolefin film comprising the steps of:
(a) forming a cast, co-extruded polyolefin film or a bi-axially oriented, co-extruded polyolefin film, wherein the film comprises,
(i) a core layer comprising an olefin polymer, said core layer is substantially void-free and non-opaque and includes an agent selected from the group consisting of phosphorescence producing agents, reflective agents, coloring agents that are non-opaque producing pigments and dyes, and blends thereof, and
(ii) an embossable outer layer on a side of said core layer, said embossable outer layer comprising an olefin polymer and having an outward surface on a side of said embossable outer layer opposite to said core layer side;
(b) embossing at least said embossable outer layer of the cast polyolefin film or oriented polyolefin film, creating an embossed surface on said outward surface of the cast polyolefin film or oriented polyolefin film; and
(c) metallizing said embossed surface;
wherein said final film has a differential appearance of holographic or prismatic images comprising (i) a shiny silver metallic appearance when said final film is viewed from the metallized outermost surface, and (ii) a metallic tinted colored appearance, a metallic reflective appearance or a metallic phosphorescent appearance, when said final film is viewed through the core layer.

31. The process according to claim 30, wherein the film further comprises,
(iii) an additional outer layer on a side of said core layer opposite to said embossable outer layer, said additional outer layer comprising an olefin polymer.

32. The process according to claim 30, wherein said step of embossing at least the embossable outer layer of the cast polyolefin film or oriented polyolefin film further comprises:
heating said outward surface of said embossable outer layer of the cast polyolefin film or oriented polyolefin film prior to embossing to soften said embossable outer layer.

33. The process according to claim 30, wherein said step of embossing at least the embossable outer layer of the cast polyolefin film or oriented polyolefin film further comprises:
contacting said embossable outer layer of the cast polyolefin film or oriented polyolefin film with at least one preheat roll and an embossing roll.

34. The process according to claim 30, wherein said film is an oriented polyolefin film and said process further comprises the step of:
heating and embossing the oriented polyolefin film after the film has been oriented.

35. The process according to claim 30, further comprising the step of:
treating at least said embossed surface of the cast polyolefin film or oriented polyolefin film with at least one of flame, plasma or corona discharge treating.

36. A process according to claim 31, wherein the film further comprises,
(iv) a first transition layer on a side of said additional outer layer between said additional outer layer and said core layer, said first transition layer comprising an olefin polymer, and
wherein said first transition layer further includes an agent selected from the group consisting of coloring agents, phosphorescence producing agents, reflective agents, and blends thereof.

37. A process for producing an embossed polyolefin film comprising the steps of:
(a) forming a cast, co-extruded polyolefin film or a bi-axially oriented, co-extruded polyolefin film, wherein the film comprises,
(i) a core layer comprising an olefin polymer,
(ii) a first transition layer on a side of said core layer, said first transition layer comprising an olefin polymer,
(iii) an embossable outer layer on a side of said first transition layer opposite to said core layer, said embossable outer layer comprising an olefin polymer and having an outward surface on a side of said embossable outer layer opposite to said first transition layer,
(iv) a second transition layer on a side of core layer opposite to said first transition layer, said second transition layer comprising an olefin polymer,
(v) an additional outer layer on a side of said second transition layer opposite to said core layer, said additional outer layer comprising an olefin polymer,
wherein at least one of said first transition layer and said second transition layer is substantially void-free, non-opaque and includes an agent selected from the group consisting of coloring agents, phosphorescence agents, reflective agents and blends thereof;
(b) embossing at least said embossable outer layer of the cast polyolefin film or oriented polyolefin film, creating an embossed surface on said outward surface of the cast polyolefin film or oriented polyolefin film; and
(c) metallizing said embossed surface;
wherein said final film has a differential appearance of holographic or prismatic images comprising (i) a shiny silver metallic appearance when said final film is viewed from the metallized outermost surface, and (ii) a metallic tinted colored appearance, a metallic reflective appearance or a metallic phosphorescent appearance, when said final film is viewed through the core layer.

38. The process according to claim 37, wherein said step of embossing at least the embossable outer layer of the cast polyolefin film or oriented polyolefin film further comprises:
heating said outward surface of said embossable outer layer of the cast polyolefin film or oriented polyolefin film prior to embossing to soften said embossable outer layer.

39. The process according to claim 37, wherein said film is an oriented polyolefin film and said process further comprises the step of:
heating and embossing the oriented polyolefin film after the film has been oriented.

40. The process according to claim 37, further comprising the step of:
treating at least said embossed surface of the cast polyolefin film or oriented polyolefin film with at least one of flame, plasma or corona discharge treating.

41. The film according to claim 10 wherein said core layer includes an agent selected from the group consisting of phosphorescence producing agents, reflective agents, coloring agents that are non-opaque producing pigments and dyes, and blends thereof.

42. The film according to claim 16 wherein said core layer includes an agent selected from the group consisting of phosphorescence producing agents, reflective agents, coloring agents that are non-opaque producing pigments and dyes, and blends thereof.

43. The film according to claim 23 wherein said core layer includes an agent selected from the group consisting of phosphorescence producing agents, reflective agents, coloring agents that are non-opaque producing pigments and dyes, and blends thereof.

44. The film according to claim 37 wherein said core layer includes an agent selected from the group consisting of phosphorescence producing agents, reflective agents, coloring agents that are non-opaque producing pigments and dyes, and blends thereof.

45. An embossed, cast, co-extruded polyolefin film or an embossed, bi-axially oriented, co-extruded polyolefin film comprising:
(a) a core layer comprising an olefin polymer, said core layer is substantially void-free and non-opaque and includes a reflective agent; and
(b) an embossed outer layer located on a side of said core layer, said embossed outer layer comprising an olefin polymer; and
(c) a metallized outermost surface on said embossed outer layer,
wherein said final film has a differential appearance of holographic or prismatic images comprising (i) a shiny silver metallic appearance when said final film is viewed from the metallized outermost surface, and (ii) a metallic reflective appearance when said final film is viewed through the core layer.

46. The film according to claim 45, further comprising:
(c) an additional outer layer on a side of said core layer opposite to said embossed outer layer, said additional outer layer comprising an olefin polymer.

47. The film according to claim 46, further comprising:
(d) a first transition layer on a side of said additional outer layer between said additional outer layer and said core layer, said first transition layer comprising an olefin polymer and including a reflective agent.

48. The film according to claim 45, wherein the olefin polymer of the core layer is selected from the group consisting of propylene homopolymers, copolymers and terpolymers, high density polyethylene (HDPE), low density polyethylene (LDPE), linear low density polyethylene (LLDPE), very low density polyethylene (VLDPE), isotactic polypropylene, syndiotactic polypropylene, and blends thereof.

49. The film according to claim 45, wherein the olefin polymer of the embossed outer layer is selected from the group consisting of polypropylenes, including syndiotactic and isotactic polypropylene, ethylene-propylene-butylene (EPB) terpolymers, ethylene-propylene (EP) copolymers, propylene-butylene random copolymers, and blends thereof.

50. The film according to claim 46, wherein the olefin polymer of the additional outer layer is selected from the group consisting of polyethylenes, high density polyethylenes (HDPE), medium density polyethylenes (MDPE), linear low density polyethylenes (LLDPE), propylene homopolymers, EPB terpolymers, EP copolymers, propylene-butylene copolymers, amorphous polyamides, EVOH copolymers, and blends thereof.

51. The film according to claim 47, wherein said reflective agent of said first transition layer is the same as said reflective agent in said core layer.

52. The film according to claim 47, wherein said reflective agent of said first transition layer is different from said reflective agent in said core layer.

53. The film according to claim 46, wherein at least one of the embossed outer layer and the additional outer layer are flame, plasma or corona discharge treated.

54. The film according to claim 46, wherein said reflective agent is a glass bead or microsphere or a cube-corner reflector.

55. An embossed, cast, co-extruded polyolefin film or an embossed, bi-axially oriented, co-extruded polyolefin film comprising:
(a) a core layer comprising an olefin polymer, said core layer is substantially void-free and non-opaque and includes a phosphorescence producing agent; and
(b) an embossed outer layer located on a side of said core layer, said embossed outer layer comprising an olefin polymer; and
(c) a metallized outermost surface on said embossed outer layer,
wherein said final film has a differential appearance of holographic or prismatic images comprising (i) a shiny silver metallic appearance when said final film is viewed from the metallized outermost surface, and (ii) a metallic phosphorescent appearance when said final film is viewed through the core layer.

56. The film according to claim 55, further comprising:
(c) an additional outer layer on a side of said core layer opposite to said embossed outer layer, said additional outer layer comprising an olefin polymer.

57. The film according to claim 56, further comprising:
(d) a first transition layer on a side of said additional outer layer between said additional outer layer and said core layer, said first transition layer comprising an olefin polymer and including a phosphorescence producing agent.

58. The film according to claim 55, wherein the olefin polymer of the core layer is selected from the group consisting of propylene homopolymers, copolymers and terpolymers, high density polyethylene (HDPE), low density polyethylene (LDPE), linear low density polyethylene (LLDPE), very low density polyethylene (VLDPE), isotactic polypropylene, syndiotactic polypropylene, and blends thereof.

59. The film according to claim 55, wherein the olefin polymer of the embossed outer layer is selected from the group consisting of polypropylenes, including syndiotactic and isotactic polypropylene, ethylene-propylene-butylene (EPB) terpolymers, ethylene-propylene (EP) copolymers, propylene-butylene random copolymers, and blends thereof.

60. The film according to claim 56, wherein the olefin polymer of the additional outer layer is selected from the group consisting of polyethylenes, high density polyethylenes (HDPE), medium density polyethylenes (MDPE), linear low density polyethylenes (LLDPE), propylene homopolymers, EPB terpolymers, EP copolymers, propylene-butylene copolymers, amorphous polyamides, EVOH copolymers, and blends thereof.

61. The film according to claim 57, wherein said phosphorescence producing agent of said first transition layer is the same as said phosphorescence producing in said core layer.

62. The film according to claim 57, wherein said phosphorescence producing agent of said first transition layer is different from said phosphorescence producing agent in said core layer.

63. The film according to claim 56, wherein at least one of the embossed outer layer and the additional outer layer are flame, plasma or corona discharge treated.

* * * * *